United States Patent
Lin et al.

(10) Patent No.: US 8,169,721 B2
(45) Date of Patent: May 1, 2012

(54) LENS ASSEMBLY AND LENS MODULE INCORPORATING THE SAME

(75) Inventors: Hou-Yao Lin, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 130 days.

(21) Appl. No.: 12/823,133

(22) Filed: Jun. 25, 2010

(65) Prior Publication Data

US 2011/0096415 A1   Apr. 28, 2011

(30) Foreign Application Priority Data

Oct. 22, 2009   (CN) .......................... 2009 1 0308640

(51) Int. Cl.
G02B 9/04 (2006.01)
G02B 3/02 (2006.01)
G02B 9/00 (2006.01)
(52) U.S. Cl. .................. 359/793; 359/717; 359/796
(58) Field of Classification Search .............. 359/717, 359/793, 795, 796
See application file for complete search history.

(56) References Cited

U.S. PATENT DOCUMENTS

2009/0086342 A1*  4/2009  Seki .............................. 359/820

* cited by examiner

Primary Examiner — William Choi
(74) Attorney, Agent, or Firm — Altis Law Group, Inc.

(57) ABSTRACT

A lens assembly comprises a first lens and a second lens. The first lens includes a first central round portion and a first peripheral stepped portion surrounding the first central round portion. The first peripheral stepped portion comprises a downward-facing surface, a first supporting surface, and a first inclined surface interconnected. The second lens includes a second central round portion and a second peripheral stepped portion surrounding the second central round portion. The second peripheral stepped portion includes an upward-facing surface, a second inclined surface, a third surface, and a second supporting surface. The second lens is engaged on the first lens in a manner that the first supporting surface contacts the second supporting surface, the downward-facing surface is facing toward the upward-facing surface, the first inclined surface contacts the second inclined surface but a gap is defined between the first inclined surface and the third surface.

10 Claims, 3 Drawing Sheets

LENS ASSEMBLY AND LENS MODULE INCORPORATING THE SAME

BACKGROUND

1. Technical Field

The present disclosure relates to an optical system, and particularly, to a lens assembly and a lens module incorporating the lens assembly.

2. Description of Related Art

Currently, along with the development of electronic devices with multiple functions, image capturing apparatuses have become widely used in a variety of consumer electronic devices, such as notebook computers, personal digital assistants (PDAs), and cellular telephones. In the meantime, there is an increasingly demand for improved image quality, which essentially depends on the quality of a lens module of the image capturing apparatus.

A lens module generally includes a barrel, a plurality of lenses received in the barrel. In addition, the plurality of lenses is assembled along an axis direction of the barrel in order to perform optical function. In order to ensure that the lenses can be precisely and firmly mounted inside the barrel, the lenses must be precisely manufactured with the external diameter substantially equal to the inner diameter of the barrel. However, the equal diameters may cause friction between the lateral sides of the lenses and the inside wall of the barrel, which makes it difficult to assemble the lenses with the barrel. Accordingly, the lenses may be placed improperly in the barrel. As a result, the assembling efficiency is lowered and the image quality of the yielded lens module is unsatisfactory. What is needed, therefore, is a lens assembly and a lens module, which can overcome the above shortcomings.

BRIEF DESCRIPTION OF THE DRAWINGS

Many aspects of the present lens assembly and lens module incorporating the same can be better understood with reference to the following drawings. The components in the drawings are not necessarily drawn to scale, the emphasis instead being placed upon clearly illustrating the principles of the present lens assembly and lens module with same. Moreover, in the drawings, like reference numerals designate corresponding parts throughout the several views.

DETAILED DESCRIPTION

Embodiments of the present lens assembly and lens module incorporating the same will now be described in detail below and with reference to the drawings.

Figure 1:
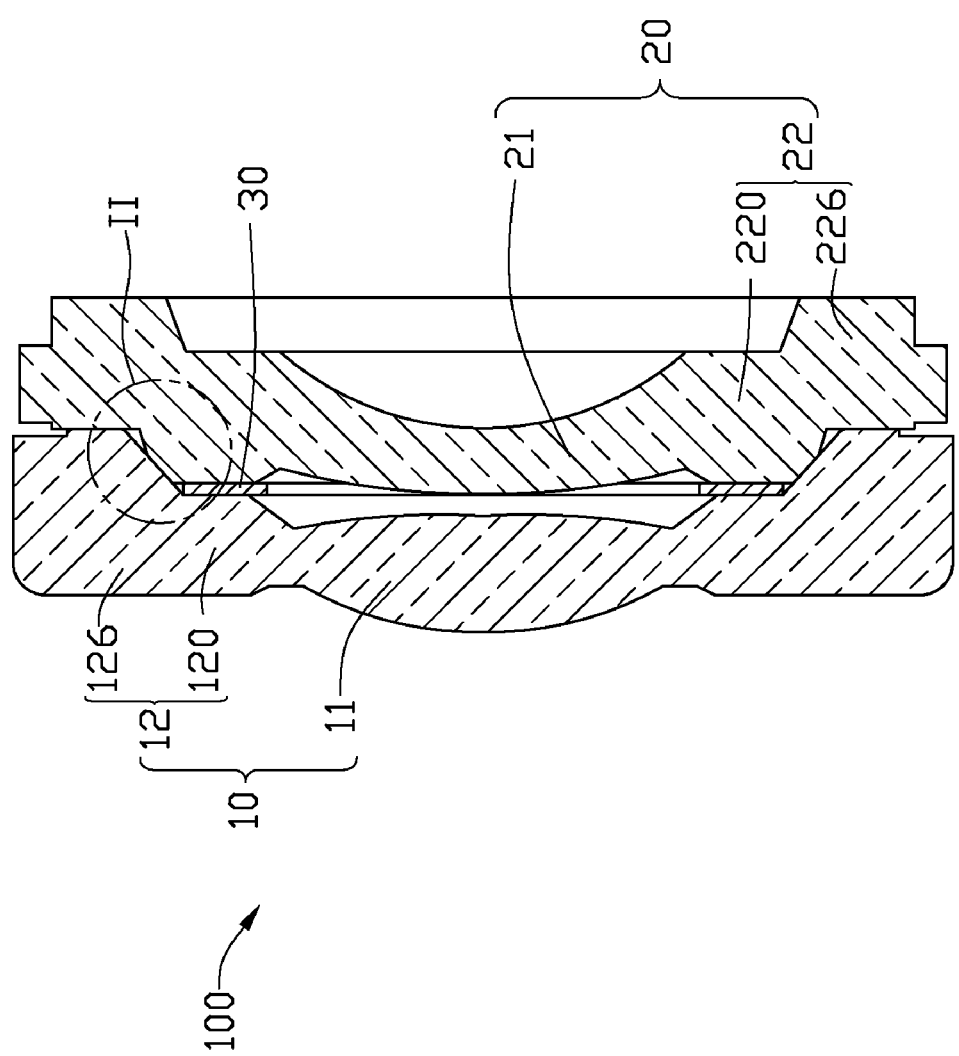
FIG. 1 is a schematic, cross-sectional view of a lens assembly of a first embodiment.
Figure 2:
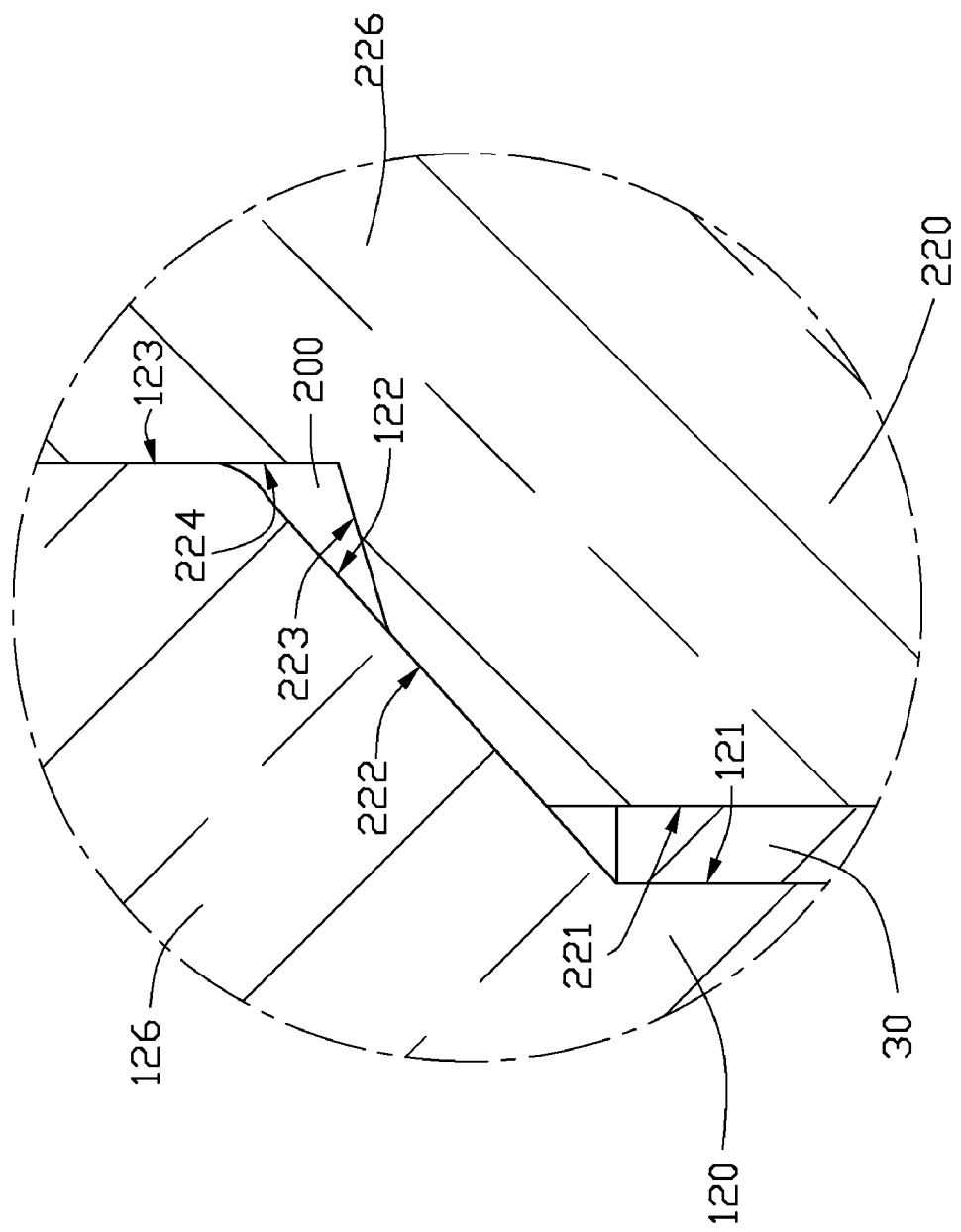
FIG. 2 is a larger view of II shown in FIG. 1.

Referring to FIG. 1 and FIG. 2, a lens assembly 100 in accordance with a first embodiment, is shown. The lens assembly 100 includes a first lens 10 and a second lens 20. The first lens 10 and the second lens 20 can be made of plastic, glass or any other suitable optical materials.

The first lens 10 includes a first central round portion 11 and a first peripheral stepped portion 12 surrounding the first central round portion 11. The first central round portion 11 is configured for performing image capturing function. The first peripheral stepped portion 12 includes a first radially extending portion 120 surrounding the first central round portion 11, and a first axially extending portion 126 extending substantially axially from the first radially extending portion 120.

The first peripheral stepped portion 12 has a downward-facing surface 121, a first supporting surface 123, and a first inclined surface 122 obliquely interconnected between the downward-facing surface 121 and the first supporting surface 123. The downward-facing surface 121 is near the first central round portion 11. The downward-facing surface 121 and the first supporting surface 123 are substantially perpendicular to the principal axis of the first lens 10.

The second lens 20 includes a second central round portion 21 and a second peripheral stepped portion 22 surrounding the second central round portion 22. The second central round portion 21 has the same function as the first central round portion 11. The second peripheral stepped portion 22 includes a second radially extending portion 220 surrounding the second central round portion 21, and a second axially extending portion 226 extending substantially axially from the second radially extending portion 220.

The second peripheral stepped portion 22 has an upward-facing surface 221, a second inclined surface 222, and a third surface 223, and a second supporting surface 224. The second inclined surface 222 is interconnected between the upward-facing surface 221 and the third surface 223. The upward-facing surface 221 and the second supporting surface 224 are perpendicular to the principal axis of the second lens 20. The size of the first inclined surface 122 is larger than that of the second inclined surface 222.

In assembly, the second lens 20 is engaged in the first peripheral stepped portion 12 of the first lens 10 in a manner that the first supporting surface 123 of the first lens 10 contacts the second supporting surface 224 of the second lens 20. The downward-facing surface 121 of the first lens 10 is facing toward the upward-facing surface 221 of the second lens 20. The first inclined surface 122 of the first lens 10 contacts the second inclined surface 222 of the second lens 20 but a gap 200 is defined between the first inclined surface 122 and the third surface 223. A spacer 30 is interposed between the downward-facing surface 121 of the first lens 10 and the upward-facing surface 221 of the second lens 20.

Expressly, an angle between the second inclined surface 222 of the second lens 20 and the principal axis of the second lens 20 is larger than an angle between the third inclined surface 223 and the principal axis of the second lens 20. The degrees of the angle between the second inclined surface 222 of the second lens 20 and the principal axis of the second lens 20 is larger than 0 degrees and smaller than 90 degrees. Expressly, the third surface 223 is substantially parallel with or inclined relative to the principal axis of the second lens 20.

In the present embodiment, because the gap 200 can hold air during the assembly of the first lens 10 and the second lens 20, the pressure of the first lens 10 and the second lens 20 is adjusted, the deformation of the first lens 10 and the second lens 20 that is influenced by the friction is greatly reduced.

It is noteworthy that the downward-facing surface 121 of the first lens 10 could contact the upward-facing surface 221 of the second lens 20.

In the first embodiment, the lens assembly 100 can be installed into the electronic devices, such as notebook computers, personal digital assistants (PDAs), or cellular telephones.

Figure 3:
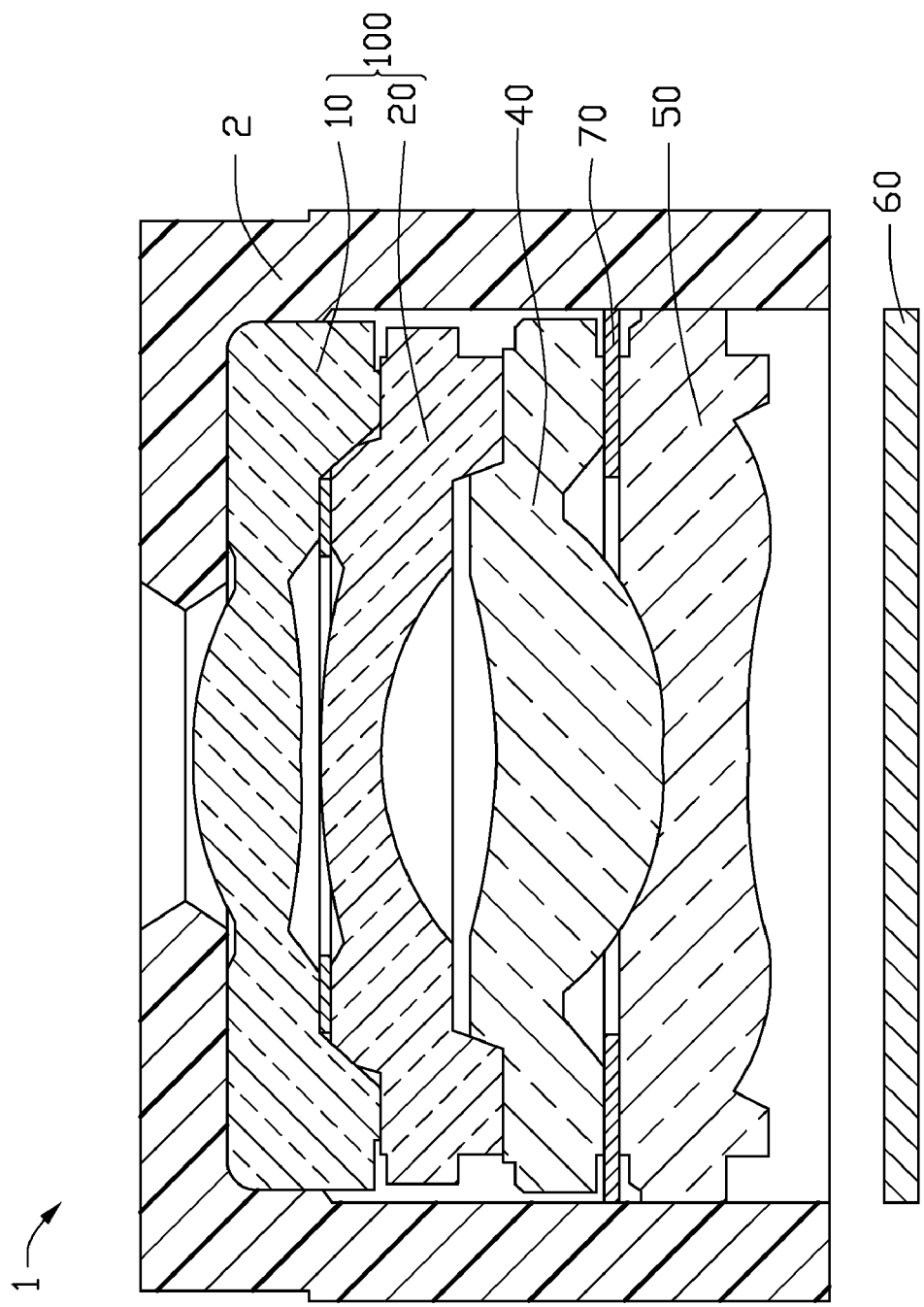
FIG. 3 is a schematic, cross-sectional view of a lens module of a second embodiment.

Referring the FIG. 3, a lens module 1 in accordance with a second embodiment, is shown. The lens module 1 includes a barrel 2 and the lens assembly 100, and includes a third lens 40, a forth lens 50, a sensor 60, and a spacer 70. The spacer 70 is interposed between the third lens 40 and the forth lens 50. The sensor 60 is positioned on image side of the barrel 2.

The barrel 2 is a cylindrical barrel and can be made of resin. The barrel 2 defines an inner space (not labeled) therein to accommodate the first lens 10, the second lens 20, the third lens 40, the forth lens 50 and the spacer 70.

The light passes through the first lens 10, the second lens 20, the third lens 40, the forth lens 50, and is captured on the sensor 60.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A lens assembly, comprising:
    a first lens including a first central round portion and a first peripheral stepped portion surrounding the first central round portion, the first peripheral stepped portion including a first radially extending portion surrounding the first central round portion and a first axially extending portion extending axially from the first radially extending portion, the first peripheral stepped portion comprising a downward-facing surface, a first supporting surface, and a first inclined surface interconnected therebetween, the downward-facing surface and the first supporting surface being substantially perpendicular to the principal axis of the first lens, the first inclined surface being inclined relative to the principal axis of the first central round portion; and
    a second lens including a second central round portion and a second peripheral stepped portion surrounding the second central round portion, the second peripheral stepped portion including a second radially extending portion surrounding the second round portion and a second axially extending portion surrounding the second radially extending portion, the second peripheral stepped portion including an upward-facing surface, a second inclined surface, a third surface, and a second supporting surface, the upward-facing surface and the second supporting surface being substantially perpendicular to the principal axis of the second lens, the second inclined surface being inclined relative to the principal axis of the second central round portion, and the third surface being inclined relative to or substantially parallel with the principal axis of the second central round portion, wherein,
    the second lens is engaged in the first lens in a manner that the first supporting surface of the first lens contacts the second supporting surface of the second lens, the downward-facing surface of the first lens faces toward the upward-facing surface of the second lens, the first inclined surface of the first lens contacts the second inclined surface of the second lens, and a gap is defined between the first inclined surface of the first lens and the third surface of the second lens.

2. The lens assembly as described in claim 1, wherein a spacer is interposed between the downward-facing surface of the first lens and the upward-facing surface of the second lens.

3. The lens assembly as described in claim 1, wherein the downward-facing surface of the first lens contacts the upward-facing surface of the second lens.

4. The lens assembly as described in claim 1, wherein the material of the first lens is selected from the group consisting of plastic and glass.

5. The lens assembly as described in claim 1, wherein the material of the second lens is selected from the group consisting of plastic and glass.

6. The lens assembly as described in claim 1, wherein a size of the first inclined surface of the first lens is larger than that of the second inclined surface of the second lens.

7. A lens module, comprising:
    a barrel; and
    a lens assembly, accommodated inside the barrel, the lens assembly including a first lens including a first central round portion and a first peripheral stepped portion surrounding the first central round portion, the first peripheral stepped portion including a first radially extending portion surrounding the first central round portion and a first axially extending portion extending axially from the first radially extending portion, the first peripheral stepped portion comprising a downward-facing surface, a first supporting surface, and a first inclined surface interconnected therebetween, the downward-facing surface and the first supporting surface being substantially perpendicular to the principal axis of the first lens, the first inclined surface being inclined relative to the principal axis of the first central round portion; and
    a second lens including a second central round portion and a second peripheral stepped portion surrounding the second central round portion, the second peripheral stepped portion including a second radially extending portion surrounding the second round portion and a second axially extending portion surrounding the second radially extending portion, the second peripheral stepped portion including an upward-facing surface, a second inclined surface, a third surface, and a second supporting surface, the upward-facing surface and the second supporting surface being substantially perpendicular to the principal axis of the second lens, the second inclined surface being inclined relative to the principal axis of the second central round portion, and the third surface being inclined relative to or parallel with the principal axis of the second central round portion, wherein,
    the second lens is engaged in the first lens in a manner that the first supporting surface of the first lens contacts the second supporting surface of the second lens, the downward-facing surface of the first lens faces toward the upward-facing surface of the second lens, the first inclined surface of the first lens contacts the second inclined surface of the second lens, and a gap is defined between the first inclined surface of the first lens and the third surface of the second lens.

8. The lens module as described in claim 7, wherein a spacer is interposed between the downward-facing surface of the first lens and the upward-facing surface of the second lens.

9. The lens module as described in claim 7, wherein the downward-facing surface of the first lens contacts the upward-facing surface of the second lens.

10. A lens assembly, comprising:
    a first lens including a first central round portion and a first peripheral stepped portion surrounding the first central round portion, the first peripheral stepped portion including a downward-facing surface, a first supporting surface, and a first inclined surface obliquely interconnected therebetween; and
    a second lens including a second central round portion and a second peripheral stepped portion surrounding the second central round portion, the second peripheral stepped portion including a radially extending portion surrounding the second round portion and an axially extending portion surrounding the second radially extending portion, the second peripheral stepped portion including an upward-facing surface, a second inclined surface, a third surface, and a second supporting surface, the third surface distinctly oriented from the second inclined surface, wherein, the second lens is engaged in the first lens in a manner that the first supporting surface of the first lens contacts the second supporting surface of the second lens, the downward-facing surface of the first lens faces toward the upward-facing surface of the second lens, the first inclined surface of the first lens contacts the second inclined surface of the second lens, and a gap is defined between the first inclined surface of the first lens and the third surface of the second lens.

* * * * *